(12) United States Patent
Ehle et al.

(10) Patent No.: US 11,182,991 B2
(45) Date of Patent: Nov. 23, 2021

(54) SYSTEM FOR SECURING A DEVICE

(71) Applicant: Schneider Electric Industries SAS, Rueil Malmaison (FR)

(72) Inventors: Valérie Ehle, Villeneuve Loubet (FR); Annick Eyraud, Antibes (FR); Yannick Buchet, Biot (FR); David Fabron, Gattières (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 17/009,844

(22) Filed: Sep. 2, 2020

(65) Prior Publication Data

US 2021/0074098 A1  Mar. 11, 2021

(30) Foreign Application Priority Data

Sep. 10, 2019  (FR) ........................................ 1909965

(51) Int. Cl.
*G07C 9/00* (2020.01)
(52) U.S. Cl.
CPC ..... *G07C 9/00571* (2013.01); *G07C 9/00309* (2013.01); *G07C 9/00904* (2013.01); *G07C 2009/00325* (2013.01)
(58) Field of Classification Search
None
See application file for complete search history.

(56) References Cited

U.S. PATENT DOCUMENTS

| 6,418,027 | B1 * | 7/2002 | Suzuki | G06F 1/183 361/679.02 |
| 8,253,554 | B2 * | 8/2012 | Wang | B60R 25/1004 340/539.1 |
| 8,813,244 | B1 * | 8/2014 | Lyon | G06F 21/88 726/27 |
| 9,098,692 | B2 * | 8/2015 | Choi | G06F 21/35 |
| 9,720,700 | B1 * | 8/2017 | Brown | G06F 13/4068 |
| 10,608,819 | B1 * | 3/2020 | Brown | H04L 9/0662 |
| 2004/0123118 | A1 * | 6/2004 | Dahan | G06F 21/74 713/189 |
| 2007/0283146 | A1 * | 12/2007 | Neveux | G06F 21/74 713/166 |
| 2009/0021350 | A1 * | 1/2009 | Hatta | G08B 21/0213 340/10.1 |
| 2009/0067079 | A1 * | 3/2009 | Al-Azzawi | G06F 21/80 360/62 |
| 2009/0122502 | A1 * | 5/2009 | Baran | H05K 7/1485 361/807 |
| 2009/0303050 | A1 * | 12/2009 | Choi | G06K 19/07749 340/572.7 |

(Continued)

FOREIGN PATENT DOCUMENTS

| WO | 2007053822 | 5/2007 |
| WO | 2018038536 | 3/2018 |

OTHER PUBLICATIONS

Search Report and Written Opinion for French Patent Application No. FR1909965 dated Jun. 22, 2020, 9 pages.

*Primary Examiner* — Curtis J King
(74) *Attorney, Agent, or Firm* — Locke Lord LLP

(57) ABSTRACT

Security system fitted in a device, the security system comprising a command element that is actuatable by an operator at least to a first position and to a second position.

17 Claims, 3 Drawing Sheets

(56) References Cited

U.S. PATENT DOCUMENTS

| | | | |
|---|---|---|---|
| 2010/0071054 A1* | 3/2010 | Hart | H04L 9/3247 726/13 |
| 2010/0079238 A1* | 4/2010 | Gravelle | G06K 19/0707 340/5.8 |
| 2010/0299493 A1* | 11/2010 | McGee, III | G06F 21/78 711/163 |
| 2011/0087870 A1 | 4/2011 | Spangler et al. | |
| 2011/0199225 A1* | 8/2011 | Touchberry | H05K 5/0208 340/679 |
| 2011/0201309 A1* | 8/2011 | Jin | G06F 21/36 455/411 |
| 2012/0008279 A1* | 1/2012 | Chin | H05K 7/1482 361/679.58 |
| 2012/0099219 A1* | 4/2012 | Al-Azzawi | G06F 21/56 360/62 |
| 2014/0181964 A1* | 6/2014 | Park | G06F 21/6209 726/19 |
| 2014/0359750 A1* | 12/2014 | Adams | G06F 21/74 726/16 |
| 2015/0229632 A1* | 8/2015 | Lee | G06F 21/46 726/4 |
| 2015/0271184 A1* | 9/2015 | Josang | H04W 12/086 726/22 |
| 2015/0280410 A1* | 10/2015 | Elberbaum | H02G 3/123 361/679.01 |
| 2016/0314319 A1* | 10/2016 | Choi | H04L 9/3278 |
| 2016/0370785 A1 | 12/2016 | Kaufleitner | |
| 2017/0286722 A1* | 10/2017 | Xia | G06F 21/74 |
| 2018/0145485 A1* | 5/2018 | Fischer | H01R 9/2675 |
| 2018/0199439 A1* | 7/2018 | Kreuter | G05B 15/02 |
| 2018/0288012 A1* | 10/2018 | Khylenko | G06F 21/606 |
| 2019/0130715 A1* | 5/2019 | Chang | G07D 11/125 |
| 2019/0288453 A1* | 9/2019 | Blake | G06F 1/18 |
| 2020/0064153 A1* | 2/2020 | Kagan | G01D 4/004 |

\* cited by examiner

SYSTEM FOR SECURING A DEVICE

TECHNICAL FIELD

The present invention relates to a security system.

It is relevant to the field of applications of automation, in particular to industrial-process automation, building automation or systems for monitoring and/or controlling a power distribution network.

PRIOR ART

It is known to use programmable logic controllers to manage domestic or industrial processes, for example to manage an electricity grid.

In order to ensure the security of these processes against any risk of theft of data or attempt at malicious intrusion, the controllers generally comprise one or more security systems that allow the stored data to be monitored and their integrity to be ensured, and the reliability of the communications of the controllers to be guaranteed.

These security systems may for example take the form of software (anti-malware tool, firewall, vulnerability search, etc.) or of physical access restrictions (keys, encrypted passwords, etc.).

By way of example, in order to control direct local access to certain controller modules, the latter comprise a security system in the form of a human-machine interface, requiring an operator to enter a password on a keyboard if he wants to gain access to the controller.

However, such systems are not entirely satisfactory.

Specifically, it is necessary to provide one human-machine interface per module of the controller. Apart from the fact that a human-machine interface is expensive, time-consuming to implement on each module and has a power consumption that is high, said interface may be vulnerable if the password is disclosed or stolen.

Furthermore, although certain operating situations require a high controller security state, a lower-security state may also be sufficient in other operating situations, which therefore do not require relatively complex security systems.

SUMMARY

The invention improves the situation.

The invention more particularly aims to provide, for a device such as a controller, an effective security system usage of which is particularly simple and flexible, and that allows in particular the security state to be simply and securely varied depending on the operating requirements.

A security system is provided, which system is fitted in a device, the security system comprising a command element that is actuatable by an operator at least:
to a first position, in which the device is configured to be in a high-security state, and
to a second position, in which the device is configured to be in a low-security state.

By virtue of these arrangements, the actuation of a command element of the device allows the expected security state to be set. Means allowing control of physical access and software means that are particularly simple and effective are thus simultaneously implemented with a view to ensuring the security of the device.

More particularly, a remote connection to the device does not allow its security state to be modified, direct access and actuation of the security system being necessary.

According to another aspect, a device comprising such a security system is provided.

According to another aspect, a method for operating such a security system is provided, this method comprising the following steps:
if the command element is in the first position:
verifying whether the security of the device has already been configured, and
if not, downloading configuration data specific to the device and configuring the security of the device before use thereof.

According to another aspect, a computer program containing instructions for implementing all or some of a method such as defined in this document when this program is executed by a processor is provided.

According to another aspect, a computer-readable non-volatile storage medium on which such a program is stored is provided.

By "computer", what is meant is any programmable means of processing information, for example a processor comprised in a desktop computer, tablet computer, mobile phone or the like.

The features described in the following paragraphs may, optionally, be implemented. They may be implemented independently of one another or in combination with one another:

The high-security state comprises a configuration of software protection functions.

The command element is actuatable by an operator manually.

The command element comprises a slot allowing a selector to be pivoted between at least the first position and the second position.

The command element is actuatable by an operator by means of a short-range wireless communication with the device.

The command element is also actuatable to a third position, in which the device is in a reset state.

The device is a programmable logic controller or a programmable-logic-controller module.

The device comprises a front face and a back face, the security system being fitted in the back face, the back face being configured to be placed in contact with a holder.

The method comprises the following steps:
if the command element is in the third position:
actuating the command element to the first position or the second position.

The actuation of the command element between the first position and the second position requires intermediate passage to the third position.

BRIEF DESCRIPTION OF THE DRAWINGS

Other features, details and advantages will become apparent on reading the detailed description below, and on analysing the appended drawings, in which.

DESCRIPTION OF EMBODIMENTS

The drawings and the description below contain, for the most part, elements of certain character. They will therefore possibly not only serve to better understand the present disclosure, but also contribute to its definition, where appropriate.

Figure 1:
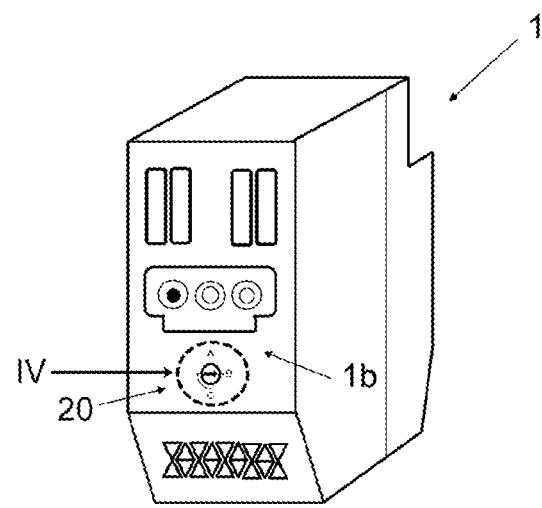
FIG. 1 shows a perspective view of the back face of a device comprising a security system according to one embodiment.

Reference is made to FIG. 1, which shows a device 1 comprising a security system according to the invention. The security system is more particularly a computer protection device, also referred to as a cybersecurity system.

According to one embodiment, the device 1 is installed in a programmable logic controller (PLC). Such a controller is configured to control an industrial or domestic process, in particular via sequential information processing. More particularly, the controller allows a command to be transmitted to one or more other controllers or actuators, the transmitted command depending on input data, such as sensor measurements, instruction data, etc.

By way of example, the controller allows machines and sensors in a factory or a building to be controlled, or a power management system to be driven.

Advantageously, the device 1 according to the invention relates to a secure controller.

According to one embodiment, the device 1 is a module, such as a communication module, of the controller. More generally, the device 1 may be any industrial module or piece of equipment allowing security to be configured remotely.

Figure 2:
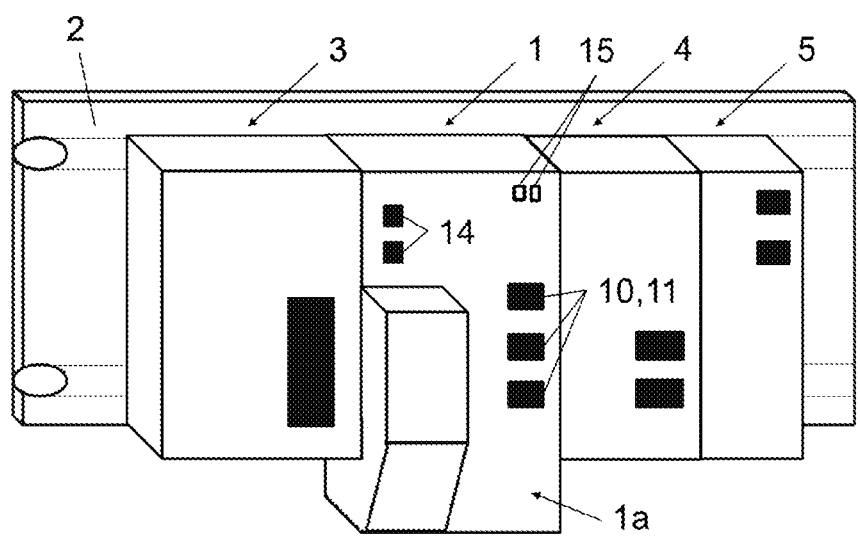
FIG. 2 shows a perspective view of the front face of the device of FIG. 1 fastened to a holder with other devices.

As illustrated in FIG. 2, the device 1 may be configured to be mounted on a holder, for example a rail 2. The holder 2 generally comprises other devices 3, 4, 5 arranged in a modular fashion with respect to one another. The device 1 may thus be stored in an electrical enclosure (not illustrated).

The device 1 generally has a parallelepipedal shape. However, other shapes are also envisionable.

The device 1 thus comprises a front face 1a, visible in FIG. 2, that is accessible to an operator.

The device 1 also comprises a back face 1b, visible in FIG. 1, that is capable of being placed facing, in particular in contact with, the holder 2. Once the device 1 has been fastened to the holder 2, the back face 1b is no longer directly accessible to the operator. It is necessary to demount the device 1 from the holder 2 in order to be able to access the back face 1b.

Figure 3:
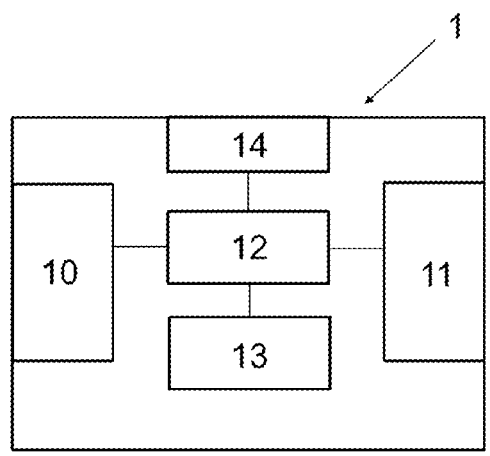
FIG. 3 shows a schematic view of the device of FIG. 1.

As illustrated in FIG. 2 and FIG. 3, the device 1 comprises input/output interfaces 10, 11 that are configured to receive and send information from/to the device 1 for the management of the process.

The device 1 also comprises a processor 12 (CPU or central processing unit) configured to process instructions that form the operating computer program of the device 1.

The device 1 also comprises a memory 13 configured to store the instructions forming the operating computer program and various other pieces of information.

The device 1 also comprises a wired or wireless communication interface 14, in particular for communication with a remote server configured to store the data of the device 1.

Lastly, the device 1 may comprise a power source, such as a battery (not illustrated), or be directly connected to an electricity grid.

According to the invention, the device 1 furthermore comprises at least one security system. The security system comprises a command element 20 that is fitted in the device 1.

As illustrated in FIG. 1, the command element 20 is advantageously fitted in the back face 1b of the device 1.

The command element 20 may be actuated by an operator.

According to one embodiment, the command element 20 may be actuated manually by the operator.

To this end, the command element 20 may comprise a slot allowing an element of the flat-head screwdriver type to be used to make a selector 21 pivot. However, other types of manual actuations are possible—a key, a crank or any other tool known per se, whether specific or not, may be used. Furthermore, other types of command element 20 are possible, such as a pivoting button etc.

According to another embodiment, the command element 20 may be actuated without contact by the operator. The actuation is advantageously carried out at short range.

By "short range", what is in particular meant is an actuation via a wireless communication with the device 1, which actuation is performed for example from a distance smaller than 1 metre, or even advantageously from a distance smaller than 10 centimetres. Such a short-range communication may for example use near-field-communication (NFC) technology.

Such a short-range communication is advantageously secure in terms of authentication, integrity, and information confidentiality.

Thus, the command element 20 is actuatable between at least a first position and a second position.

In the first position (illustrated by position A in FIG. 4), the device 1 is in a high-security state. More particularly, the device 1 requires a prior security configuration in order to be able to be used. Such a configuration allows protection functions, in particular software protection functions, that are known per se, such as data encryption, a firewall, access control, protection diagnostics, updates, etc., to be implemented.

By way of example, the device 1 cannot set up any communication until the security state has been configured. Once in the security state, communications are authenticated and secured.

In the second position (illustrated by position B in FIG. 4), the device 1 is in a low-security state.

By "low-/high-security states", what is meant is that the security states are to be understood relative to each other. Thus, the low-security security state may correspond to a standard state, in which the device 1 does not require security configuration, or comprises protection functions that are relatively less involved than those provided in the high-security state.

According to one embodiment, the command element 20 may furthermore be actuated to one or more other positions corresponding to other security states of the device 1, which states are not described below.

Figure 4:
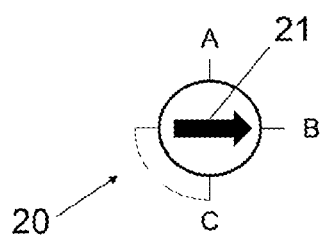
FIG. 4 shows a partial, enlarged view of the back face of the device of FIG. 1.

In the embodiment illustrated in FIG. 4, the command element 20 may also be actuated to a third position.

In the third position (illustrated by position C in FIG. 4), the device 1 is in a reset state. More particularly, the device 1 is returned to its initial state, in particular to the state it was in when it left the factory. The security configuration and some or all of the protection functions potentially implemented by the device 1 are deleted, in particular erased from the memory 13 of the device 1.

The device 1 advantageously comprises a dedicated output allowing the operator to learn the security state of the device 1, for example via a signal tower or stack light mounted on the electrical enclosure containing the device 1 or via a software application intended for the operator.

The device 1 may also comprise an indicator allowing an operator to in particular learn the security state of the device 1. The indicator is placed on the front face 1*a* of the device 1, as illustrated in FIG. 1.

According to one embodiment, the indicator comprises one or more indicator lights 15 allowing the security, diagnostic and/or operating state of the device 1 to be displayed. The operator may in particular compare the display of the one or more lights 15 with the position of the security system, in order to satisfy himself of the integrity of the device 1.

Figure 5:
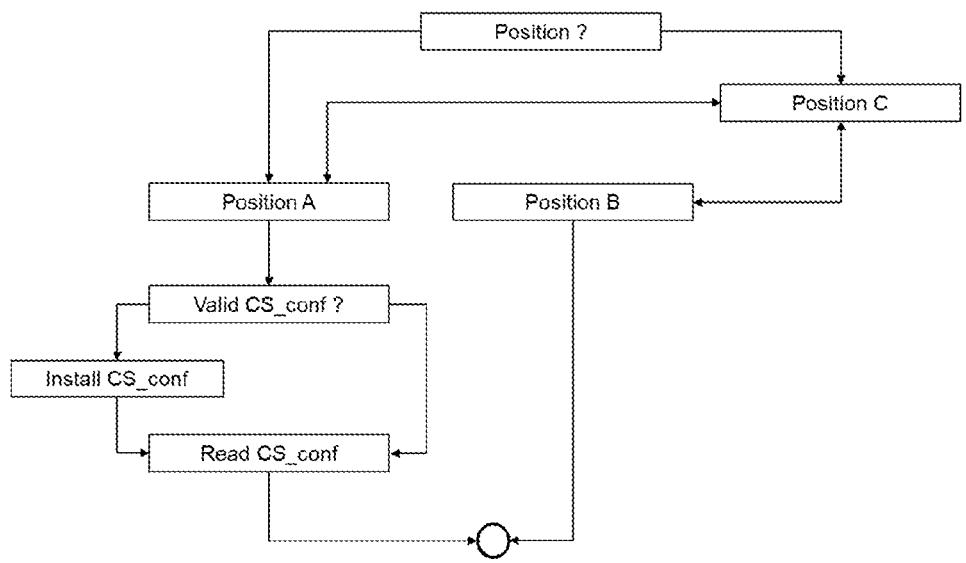
FIG. 5 shows a chart illustrating the method for operating the security system according to one embodiment.

A method for operating, and more particularly installing, the security system of the device 1 is described below with reference to FIG. 5.

Initially, the command element 20 is in one of the first, second or third positions A, B, C, corresponding to the device 1 in the high-security state, the low-security state and the reset state, respectively.

If the command element 20 is initially in the first position, a step of the method consists in verifying whether the security of the device 1 has already been configured.

If the configuration has already been carried out, the device 1 may be used.

If the security of the device 1 has not yet been configured, the method comprises one or more additional configuring steps. In these configuring steps, security data CS_conf may be downloaded by the device 1, in particular by means of the communication interface 14. These data are for example downloaded via an Ethernet or USB communication from a specific configuration application stored in a remote server or in an internal web server.

As a variant, the security data CS_conf may already be stored in the memory 13 of the device 1.

The security is configured by means of a computer program that is advantageously already present in the device 1. Once the configuration has been performed, the security is in place and the device 1 may be used.

If the command element 20 is initially in the second position, the device 1 may be used without requiring particular configuration of the security of the device 1.

If the command element 20 is initially in the third position, the command element 20 must be actuated to one of the other positions before any use, in order to put the device 1 in the high- or low-security state. The steps described above of the method may then subsequently be implemented.

During its use, the device 1 is fasted to the holder 2. The back face 1*b* of the device 1 is then no longer directly accessible to the operator.

Furthermore, the actuation of the command element 20 is advantageously deactivated when the device 1 is used, in particular connected to the power source.

This makes it possible to prevent the command element 20 from being able to be easily actuated to modify the security state of the device 1 after it has been turned on.

Thus, if it is desired to pass from the high-security state to the low-security state, or vice versa, it is necessary, beforehand, to unplug the device 1 from the power source and/or to separate the device 1 from the holder 2 in order to make the back face 1*b* of the device 1 once again accessible.

In case of unauthorized actuation of the command element 20, the security system may comprise an alarm (not illustrated), for example a visual or audio alarm, allowing the operator to be apprised.

According to one embodiment, to pass from a high-security state to a low-security state, or vice versa, it is preferably necessary to actuate the command element 20 to the third position.

Thus, the security configuration is necessarily deleted before the device 1 can pass to the other security state. This makes it possible to ensure that no information relating to the configuration of the device 1 can be preserved in the low-security state, which is potentially more vulnerable to cyberattacks.

Of course, the invention is not limited to the embodiments described above, which were provided solely by way of example. It encompasses various modifications, alternative forms and other variants that those skilled in the art will be able to envision in the context of the present invention, and in particular all of the combinations of the various modes of operation described above, whether considered separately or in association.

The invention claimed is:

1. A security system configured to be fitted in a device, the device forming part of a programmable logic controller and comprising a front face and a back face, the security system configured to be fitted in the back face, the back face being configured to be placed in contact with a holder when the device is in use, the security system comprising a command element that is actuatable by an operator at least:
   to a first position, in which the device is configured to be in a high-security state, and
   to a second position, in which the device is configured to be in a low-security state,
wherein the back face of the device is not directly accessible to the operator when the back face is in contact with the holder.

2. The security system according to claim 1, wherein the high-security state comprises a configuration of software protection functions of the device.

3. The security system according to claim 1, wherein the command element is actuatable by an operator manually.

4. The security system according to claim 3, wherein the command element comprises a slot allowing a selector to be pivoted between at least the first position and the second position.

5. The security system according to claim 1, wherein the command element is actuatable by an operator by means of a short-range wireless communication with the device.

6. The security system according to claim 1, wherein the command element is also actuatable to a third position, in which the device is in a reset state.

7. The security system according to claim 1, wherein the command element is deactivated when the device is connected to a power source.

8. A device forming part of a programmable logic controller and comprising a front face, a back face and a security system fitted in the back face, the back face being configured to be placed in contact with a holder when the device is in use, the security system comprising a command element that is actuatable by an operator at least to: a first position, in which the device is configured to be in a high-security state, and to a second position, in which the device is configured to be in a low-security state, wherein the back face of the device is not directly accessible to the operator when the back face is in contact with the holder.

9. The device according to claim 8, wherein the command element is deactivated when the device is connected to a power source.

10. The device according to claim 9, wherein actuating the command element between the first position and the second position requires at least one of separating the device from the holder or disconnecting the device from the power source.

11. A method for operating a security system of a device, the device forming part of a programmable logic controller and comprising a front face, a back face and the security system, wherein the security system is fitted in the back face of the device, the back face being configured to be placed in contact with a holder when the device is in use, the security system comprising a command element actuatable by an operator at least: to a first position, in which the device is configured to be in a high-security state, and to a second position, in which the device is configured to be in a low-security state, wherein the back face of the device is not directly accessible to the operator when the back face is in contact with the holder, the method comprising:
   if the command element is in the first position:
      verifying whether the security of the device has already been configured, and
      if not, downloading configuration data specific to the device and configuring the high-security state of the device before use of the device.

12. The method according to claim 11, wherein the command element of the security system is also actuatable to a third position, in which the device is in a reset state, the method comprising:
   if the command element is in the third position:
      actuating the command element to the first position or the second position.

13. The method according to claim 12, wherein the actuation of the command element between the first position and the second position requires intermediate passage to the third position, and wherein intermediate passage to the third position when actuating the command element from the first position to the second position deletes information regarding a security configuration associated with the high security state before entering the low security state.

14. The method according to claim 11, further comprising deactivating the command element when the device is connected to a power source.

15. A non-transitory computer-readable storage medium on which is stored a program for implementing the method according to claim 11 when the program is executed by a computer.

16. A non-transitory computer-readable storage medium on which is stored a program for implementing the method according to claim 12 when the program is executed by a computer.

17. A non-transitory computer-readable storage medium on which is stored a program for implementing the method according to claim 13 when the program is executed by a computer.

* * * * *